United States Patent Office 2,965,523
Patented Dec. 20, 1960

2,965,523

SCALE REMOVAL FROM FERROUS METAL SURFACES

James P. Engle, Tulsa, Okla., assignor to The Dow Chemical Company, Midland, Mich., a corporation of Delaware No Drawing. Filed Feb. 12, 1957, Ser. No. 639,623

13 Claims. (Cl. 134—27)

The invention relates to the removal of scale from ferrous metal surfaces. It particularly relates to the removal of scale deposited on the interior of boilers and tubes, and transfer systems through which fluids are circulated.

In apparatuses and devices employing circulating fluids, e.g., heat-control or heat-transfer media such as are used in heat exchangers and steam-powered engines, including those employing nuclear fission as a source of heat for generating steam, the formation of scale on the interior surfaces of the tubes and other fluid-contacting surfaces, especially on surfaces containing iron, has been a continuing source of trouble. The accumulation of scale markedly reduces the thermal conductivity of the shells, coils, and return tubes of such apparatus. The capacity is greatly limited and the scale thus formed constricts the passages therein thereby impeding free circulation even to the extent of causing dangerous pressure build-up. The metal in the shells, coils, tubes, etc. often suffers serious damage from excessive heat due to the thermal insulation of the scale and to the insufficient flow of fluid therethrough to properly dissipate the heat. Metals commonly employed in fluid circulatory systems often eventually weaken and melt through after protracted periods of subjection to such excessive heat. Ferrous metals are widely emmployed as the fluid-contacting metal in circulating systems. Scale formed on ferrous surfaces contain iron compounds. Iron-containing scale is particularly tenacious and resists removal by known methods because the iron compounds therein render the scale relatively insoluble in solvents currently employed.

Various methods of removing the scale thus formed have been suggested with but limited success. Among the methods suggested for removing the scale is that of filling the unit comprising fluid-containing tubes and chambers with an acidic aqueous liquid to dissolve the scale. This method has been limited in its effectiveness because the solubility of the loosened scale in the acidic-aqueous liquid is low. Therefore, after a brief initial attack on the exposed surface of the scale, the action substantially ceases due to the saturation of the acidic-aqueous liquid with the loosened scale. A further difficulty is that much of the scale that is loosened settles as a precipitate in the tubes or chambers. Flushing the tubes with water and repeating the process has made the process but little more effective. Similar difficulties are encountered on attempting to remove scale by immersing scale-coated metal articles in descaling compositions.

As a consequence of the failure of known methods to satisfactorily remove scale from ferrous surfaces, there is a need for an effective method of removing the scale especially that formed on the interior of fluid-containing chambers and tubes including those in heat exchangers and steam-powered engines. The principal object of the invention is to provide a method to meet this need. The mode by which this and related objects are attained will be made clear in the following description hereinafter set forth.

The invention is based on the discovery that iron-containing scale is effectively removed by subjecting it to the action of an aqueous-phosphoric acid solution to form phosphates which, when subsequently treated with an aqueous-caustic solution, are transformed into acid-soluble hydroxides which are thereafter dissolved and removed by a second treatment with an aqueous-phosphoric acid solution. The caustic employed is an alkali hydroxide or carbonate.

Briefly, the invention consists essentially of filling the fluid-containing or fluid-transfer circulating system, having scale therein to be removed, with an aqueous solution containing phosphoric acid at an elevated temperature but preferably below its boiling point, draining the phosphoric acid solution therefrom, filling the drained system with an aqueous solution of the caustic defined above (preferably at about the boiling temperature of the aqueous-caustic solution), again draining the system, refilling the system with a second aqueous solution containing phosphoric acid, draining the aqueous phosphoric acid solution, and flushing the system with water. A known inhibitor against metal attack may be admixed with the acid solution before use. In one embodiment of the invention water is employed to flush the surface being treated following each drain step. As an alternative mode of practicing the invention, the surface being treated is blown substantially dry with a relatively unreactive gas. A preferred embodiment is both to flush the surface and thereafter to blow with a gas following each drain step. An example of a relatively unreactive gas suitable to employ is nitrogen, although air may be employed. The process may be repeated if a particularly persistent scale is encountered but usually the system is substantially free of scale after one treatment.

Phosphoric acid reacts with the scale to form various phosphates. Since the scale to be removed contains large proportions of iron compounds, particularly FeO and $Fe_2O_3$, the compounds $Fe_3(PO_4)_2$ and $FePO_4$ are among the phosphates formed when the scale is subjected to the action of phosphoric acid. The solubility of iron oxides, especially that of the $Fe_2O_3$, in an aqueous phosphoric acid solution is low. For example, at 158° F., only 5.54 percent by weight of FeO is soluble in a 20.8 percent aqueous solution of $H_3PO_4$ and only 1.08 percent by weight of $Fe_2O_3$ is soluble in a 32.5 percent aqueous solution of $H_3PO_4$. When the iron phosphates are subjected to the action of the caustic employed in the invention, $Fe(OH)_2$ and $Fe(OH)_3$ are formed. These hydroxides are highly soluble in phosphoric acid. Therefore, the second addition of the phosphoric acid solution readily dissolves the iron hydroxides thus formed. The water flushes out substantially all residual acid solution. Blowing a relatively unreactive gas, e.g., nitrogen, through the system being treated following each water-flushing step, reduces the time required for flushing. Such a blowing step also leaves the system substantially dry. There is, as a result thereof, no appreciable dilution of the next treating solution injected into the system. When the circulating fluid employed is the system is other than water, or when a system is not to be put back in operation within a short time, it is particularly advisable to follow the final water-flushing with the gas-blowing step. Dissolving the phosphates formed by the action of the first phosphoric acid solution on the scale, removing the thus-dissolved phosphates and thereafter forming more phosphates by a second phosphoric acid solution, which are also removed, render the process highly effective.

The concentration of the aqueous phosphoric acid solution employed, both in the first and second addition, is usually between 15 and 25 percent by weight of $H_3PO_4$ but is effective as low as 5 percent and may be as high as 30 percent. It is preferable that the first addition of the phosphoric acid solution contain an inhibitor to metal attack. Among such inhibitors are: glycol ethers of an ethanol rosin amine as described in U.S. Patent 2,510,063; reaction products of a rosin amine, formaldehyde, and a ketone as described in U.S. Patent No. 2,758,970; organic reaction products prepared by reacting certain organic chlorides with a cyclic coal tar base, e.g., quinoline and pyridine, to form an intermediate product and reacting the intermediate product with thiourea or a thiocyanate to form an end product as described in U.S. Patent No. 2,403,153; or a composition comprising formaldehyde, an organic nitrogen base, e.g., an aromatic ternary amine, and a sulfated or sulfonated organic compound, as described in U.S. Patent No. 2,606,873. The temperature of the first addition of phosphoric acid solution and the time it is retained in contact with the surface to be descaled, as a circulating system, are not highly critical but the most economical and efficient temperature and time are 140° to 175° F. for from 1 to 4 hours and preferably 2 to 3 hours. The temperature may be as high as 200° F. without serious adverse consequences. The temperature and time depend upon the thickness of the scale to be removed and the tenacity of the bond between the scale and the metal surface.

The caustic solution to be employed is an aqueous alkali hydroxide or carbonate. Preferably it is an aqueous solution of NaOH between 1 and 30 weight percent preferably at a temperature of 200° to 212° F. Temperatures as low as 175° F., however, are effective. A preferred range of the caustic is 5 to 10 percent. If the caustic solution is added cool and heated by live steam, allowance must be made for dilution due to the condensation of the live steam. The time during which the caustic is held in contact with the phosphoric acid treated scale is usually from 0.5 to 3 or 4 hours. Any alkali hydroxide or carbonate may be used. The hydroxides are preferred because the carbonates require a higher concentration and a longer time in contact with the surface to be descaled. It has been found that a 5 percent solution of an alkali metal hydroxide is as effective as is a 15 percent solution of the carbonate of the same alkali metal.

The second addition of phosphoric acid solution is usually of the same strength as the first although it may vary anywhere within the range stated above. The period of time that the second addition of phosphoric acid solution is retained in the system, which is in contact with the scale, however, is usually somewhat longer than the period of time during which the first solution was retained, the period ranging up to 8 hours or longer with 5 to 6 hours generally being employed.

The water-flushing step is that normally employed to flush residual liquid and loose solid material from a fluid-conducting line. Water at somewhat above normal water system pressures may be employed to reduce the amount of water consumed and the time required.

The steps of a preferred mode of practicing the invention are illustrated by the following recipe:

(1) The unit to be descaled is filled with a 21 percent aqueous solution of $H_3PO_4$ at about 150° F. and retained therein for about 2 hours or until the saturation of $FePO_4$ in the aqueous phosphoric acid solution of the strength employed has been reached. The percentage of iron phosphates dissolved may be ascertained by drawing off samples from the unit and analyzing them for iron phosphates and comparing the results with a table of solubilities. Some limited attack on the scale may continue for a time thereafter, but will only result in the iron phosphates formed in excess of the saturation point precipitating out in the tubes, chambers, and coils of the unit. The phosphoric acid solution is drained out. If desired, the residual solution is flushed out with water and/or blown out with a substantially unreactive gas, e.g., nitrogen.

(2) The unit is then filled with a 5 percent aqueous solution of NaOH and heated to between 208° and 212° F. for about 2 hours. The caustic solution is then drained out. The unit thereafter may be flushed with water and/or blown clean with a substantially unreactive gas.

(3) The unit is refilled with a second addition of the aqueous $H_3PO_4$ solution employed in step 1 and held to about 150° F. for about 6 hours to dissolve the remaining scale. The second addition of $H_3PO_4$ solution is then flushed out with water. The unit may be then put back in operation but it is recommended that it be further treated according to step 4:

(4) The unit is given a rust-inhibiting treatment following the dissolution of the remaining scale, as by filling it with a 1 percent aqueous solution of $H_3PO_4$, allowing it to stand for from 2 to 3 hours, and flushing it out with water and preferably blowing it substantially dry with a gas. This treatment is referred to as passivation. Any known method of passivating exposed iron surfaces against oxidative attack may be employed. The unit is then ready to be put back in operation.

In comparison, when the above recipe is followed except that step 2 employing the caustic solution is omitted, excessive scale and precipitate remain in the tube.

The following example further illustrates the practice of the invention:

The water-steam circulating system of a 1500 p.s.i. Foster-Wheeler steam-generating boiler was descaled as follows: Nine batches of 350 gallons of a 21 percent aqueous solution of phosphoric acid at an average temperature of 165° F., containing 0.4 percent of a corrosion inhibitor prepared according to U.S. Patent 2,403,153, were pumped into the boiler over a period of 7 hours. The acid solution was circulated briefly and allowed to stand for about 4 hours from the time of addition of the last batch.

The boiler was then drained and nitrogen gas blown through it at 18 p.s.i. gauge pressure for 0.5 hour.

A 5 percent solution of aqueous NaOH was then prepared and the boiler filled therewith at about 70° F. to about ¾ capacity and heated to its boiling temperature by means of live steam released into the boiler. The steam thus used for heating added sufficient water to substantially fill the system. About 3 hours were consumed in adding the NaOH solution and the steam. The NaOH solution was allowed to remain in the boiler for 5 additional hours. The boiler was then drained and blown with air.

The boiler was then refilled with a 21 percent aqueous solution of $H_3PO_4$ at an average temperature of 165° F., consuming about 6.5 hours in the filling. The $H_3PO_4$ solution was retained in the boiler for an additional 3.5 hours and again drained.

The boiler was thereafter filled with a 1 percent aqueous solution of phosphoric acid at 150° F. and allowed to stand thus filled for 2 hours, as a passivation step against after-corrosion; it was then drained and flushed with water.

The boiler was examined and found to be clean, i.e., the interior of the fluid-circulating system of the boiler was substantially free from both scale and precipitated obstructants to free passage therethrough such as flakes, granules, pellets or the like.

The time consumed in adding the solutions in the example above, which is a relatively large-scale operation, is not in any way a requirement of the invention. The equipment at hand, the size of the unit being descaled, the urgency of the operation, and convenience may suggest a considerably shorter or longer time. The length of time consumed in adding a solution, however, is advantageously considered in determining the optimum additional standing time after addition thereof before draining the solution.

An evaluation of the method of the invention shows it to possess definite advantages over methods heretofore employed to remove scale from ferrous metal surfaces. The materials employed are inexpensive and the steps comprising the method are relatively simple. The saving in heating costs and in the prolonged life of the tubes, chambers, valves, and other fluid-contacting parts of a circulation system thus descaled is extensive.

Having described the invention, what is claimed and desired to be protected by Letters Patent is:

1. The method of removing adhering scale from a scale-coated ferrous metal surface which is subject to stress-cracking due to residual chloride which comprises the steps of (1) subjecting the adhering scale to the action of an aqueous solution containing between 5 and 30 percent phosphoric acid at from 100° F. to 200° F. for a sufficient time to loosen at least the more exposed portions of the scale and expose new areas of said adhering scale, (2) removing the so-used aqueous-acid solution, (3) subjecting the thus loosened scale to the action of an aqueous solution of a caustic selected from the class consisting of the hydroxides and carbonates of the alkali metals at from 175° to 212° F. to dissolve the thus loosened scale, (4) removing the so-used caustic solution, (5) subjecting the caustic-treated loosened scale and newly exposed areas of adhering scale to the further action of an aqueous solution containing between 5 and 30 percent phosphoric acid to dissolve said caustic-treated loosened scale and to loosen adhering scale from newly exposed areas of said scale for from 1 to 8 hours, (6) removing the so-used aqueous acid solution and (7) flushing the thus-treated ferrous surface with water.

2. The method according to claim 1 wherein the aqueous solution of phosphoric acid employed in step 1 and the aqueous solution of caustic employed in step 2 are each retained in contact with said surface for from 0.5 to 4.0 hours.

3. The method according to claim 1 wherein the caustic is sodium hydroxide.

4. The method according to claim 3 wherein the concentration of sodium hydroxide in the aqueous solution of caustic is between 1 and 30 percent by weight of the sodium hydroxide.

5. The method according to claim 1 wherein the temperature of the aqueous solution of caustic is between 200° and 212° F.

6. The method according to claim 1 wherein the concentration of the aqueous solutions of phosphoric acid is between 15 and 25 percent by weight of $H_3PO_4$.

7. The method according to claim 1 wherein the temperature of the aqueous solutions of phosphoric acid is between 140° and 175° F.

8. The method according to claim 1 wherein the aqueous solutions of phosphoric acid contains an inhibitor to metal attack.

9. The method of treating ferrous metal vessels which are subject to stress-cracking due to residual chlorides for the removal of adhering iron oxide-containing scale therefrom which comprise the steps of (1) contacting the interior surfaces of said vessels with a substantially chloride-free aqueous acidic solution containing between 5 and 30 percent by weight of $H_3PO_4$ for from 0.5 to 5 hours to convert a portion of the iron oxide in said scale to the iron phosphates, (2) removing the acidic solution so used, (3) treating the phosphates thus formed with an aqueous solution of a caustic selected from the class consisting of alkali metal hydroxides and carbonates in an amount by weight of between 1 and 30 percent when the hydroxides are used and between 5 and 45 percent when the carbonates are used for from 0.5 to 4.0 hours to convert a substantial portion of said phosphates to relatively insoluble hydroxides, (4) removing the caustic solution thus used, (5) introducing a substantially chloride-free aqueous acidic solution containing between 5 and 30 percent by weight of $H_3PO_4$ into said vessels to dissolve substantial portions of the hydroxides thus formed and to contact additional areas of said adhering scale and (6) flushing the vessels with water.

10. The method according to claim 9 wherein the vessels are blown with a substantially unreactive gas following step 6.

11. The method of claim 9 wherein the water flushing step following step 6 is followed by treatment of the vessels with a rust inhibiting passivator.

12. The method of claim 11 wherein the rust inhibiting passivator treatment is followed by flushing with water.

13. The method of claim 9 wherein steps 1, 2, and 3, are repeated in sequence until the scale in said vessels has been substantially all removed.

References Cited in the file of this patent

UNITED STATES PATENTS

| | | |
|---|---|---|
| 1,049,054 | Coombs | Dec. 31, 1912 |
| 1,470,225 | Holmes | Oct. 9, 1923 |
| 1,892,093 | Battistella | Dec. 27, 1932 |
| 2,347,742 | Keene | May 2, 1944 |
| 2,559,445 | Lotz | July 3, 1951 |
| 2,567,835 | Alquist | Sept. 11, 1951 |

FOREIGN PATENTS

| | | |
|---|---|---|
| 236,242 | Great Britain | June 29, 1925 |
| 306,604 | Great Britain | Feb. 22, 1929 |